(12) United States Patent
Watanabe et al.

(10) Patent No.: US 10,464,235 B2
(45) Date of Patent: Nov. 5, 2019

(54) EXTRUSION PELLETIZER FOR POLYCARBONATE RESIN AND METHOD FOR EXTRUSION-PELLETIZING POLYCARBONATE RESIN

(71) Applicant: IDEMITSU KOSAN CO., LTD., Chiyoda-ku (JP)

(72) Inventors: Nobuhiro Watanabe, Ichihara (JP); Takayoshi Tanaka, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 154 days.

(21) Appl. No.: 14/765,450

(22) PCT Filed: Dec. 25, 2013

(86) PCT No.: PCT/JP2013/084562
§ 371 (c)(1),
(2) Date: Aug. 3, 2015

(87) PCT Pub. No.: WO2014/119187
PCT Pub. Date: Aug. 7, 2014

(65) Prior Publication Data
US 2015/0360393 A1 Dec. 17, 2015

(30) Foreign Application Priority Data
Feb. 4, 2013 (JP) .................. 2013-019945

(51) Int. Cl.
*B29C 48/04* (2019.01)
*B29B 9/02* (2006.01)
(Continued)

(52) U.S. Cl.
CPC ............... *B29B 9/02* (2013.01); *B01D 35/18* (2013.01); *B29C 48/04* (2019.02); *B29C 48/69* (2019.02);
(Continued)

(58) Field of Classification Search
CPC .... B29B 9/00; B29B 9/02; B29B 9/06; B29B 9/065; B29C 47/0011; B29C 47/08;
(Continued)

(56) References Cited

U.S. PATENT DOCUMENTS 2,572,677 A * 10/1951 Tench .................... B29C 47/86
425/144
5,456,828 A 10/1995 Tersi et al.
(Continued)

FOREIGN PATENT DOCUMENTS

CN 102122007 A 7/2011
CN 202607876 U 12/2012
(Continued)

OTHER PUBLICATIONS

Extended European Search Report dated Aug. 25, 2016 in Patent Application No. 13874119.4.
(Continued)

*Primary Examiner* — Matthew J Daniels
*Assistant Examiner* — Andrew D Graham
(74) *Attorney, Agent, or Firm* — Oblon, McClelland, Maier & Neustadt, L.L.P.

(57) ABSTRACT

An extrusion pelletizer for a polycarbonate resin includes: an extruder; a cooling unit; and a cutter. The extruder includes a cylinder top, a first adapter, a polymer filter unit, a second adapter, and a die head. The polymer filter unit includes a plurality of stick-shaped filter elements therein. A temperature of the second adapter is set to be lower than a temperature of the polymer filter unit. The cooling unit and the cutter are disposed under an atmosphere in which air cleanliness defined in accordance with JIS B 9920 is any one of class 1 to class 7.

11 Claims, 3 Drawing Sheets

(51) Int. Cl.

| | |
|---|---|
| *B01D 35/18* | (2006.01) |
| *B29C 48/69* | (2019.01) |
| *B29C 48/694* | (2019.01) |
| *B29B 9/06* | (2006.01) |
| *B29K 69/00* | (2006.01) |
| *B29C 48/30* | (2019.01) |
| *B29C 48/00* | (2019.01) |
| *B29C 48/345* | (2019.01) |
| *B29C 48/87* | (2019.01) |

(52) U.S. Cl.
CPC .............. *B29C 48/694* (2019.02); *B29B 9/06* (2013.01); *B29C 48/0022* (2019.02); *B29C 48/30* (2019.02); *B29C 48/345* (2019.02); *B29C 48/87* (2019.02); *B29C 2793/0027* (2013.01); *B29K 2069/00* (2013.01)

(58) Field of Classification Search
CPC ..... B29C 47/081; B29C 47/864; B29C 47/88; B01D 35/18
USPC .................................................. 264/142, 143
See application file for complete search history.

(56) References Cited

U.S. PATENT DOCUMENTS

| | | | |
|---|---|---|---|
| 5,484,539 A | 1/1996 | Tersi et al. | |
| 6,238,613 B1* | 5/2001 | Batchelder | B29C 47/0033 137/13 |
| 6,471,877 B1* | 10/2002 | Murakami | B29B 13/10 210/346 |
| 6,595,765 B1* | 7/2003 | Lengerich | B01F 7/24 425/131.1 |
| 6,720,406 B1 | 4/2004 | Elsner et al. | |
| 8,313,051 B2* | 11/2012 | Stall | B29B 7/94 241/21 |
| 2005/0225010 A1* | 10/2005 | Soulier | B01F 5/0682 264/449 |
| 2008/0237906 A1* | 10/2008 | Yoshida | B29B 9/06 264/5 |
| 2009/0062427 A1* | 3/2009 | Tornow | B29B 9/065 425/382 R |
| 2009/0268292 A1* | 10/2009 | Nakai | B29C 71/02 264/345 |
| 2009/0273112 A1* | 11/2009 | Boothe | B29B 9/065 264/148 |
| 2010/0113653 A1* | 5/2010 | Ueda | B29C 47/6018 264/176.1 |
| 2010/0133717 A1* | 6/2010 | Boczon | B29B 9/06 264/148 |
| 2010/0270229 A1* | 10/2010 | Hartmann | B29C 47/687 210/350 |
| 2011/0006015 A1* | 1/2011 | Leonard | B01D 29/15 210/767 |
| 2011/0215499 A1* | 9/2011 | Luedeke | B29B 9/06 264/143 |
| 2011/0245451 A1* | 10/2011 | Kim | B29C 47/38 264/15 |
| 2011/0291319 A1 | 12/2011 | Avery et al. | |
| 2012/0100339 A1* | 4/2012 | Haynes | B29C 43/222 428/141 |
| 2012/0213876 A1* | 8/2012 | Stark | B29B 9/06 425/10 |
| 2012/0228794 A1* | 9/2012 | Martin | B29B 9/065 264/69 |
| 2012/0232243 A1* | 9/2012 | Namiki | B29C 45/0001 528/371 |
| 2012/0241995 A1* | 9/2012 | Wasmuht | B29B 9/06 264/142 |
| 2012/0256341 A1* | 10/2012 | Gloeckner | B29B 9/16 264/140 |
| 2012/0280419 A1* | 11/2012 | Martin | B29B 9/065 264/140 |
| 2012/0299210 A1* | 11/2012 | Nising | B29C 44/3446 264/143 |
| 2012/0319318 A1* | 12/2012 | Wang | B29C 47/369 264/101 |
| 2012/0321737 A1* | 12/2012 | Makida | B29B 9/065 425/378.1 |
| 2013/0126410 A1 | 5/2013 | Arita et al. | |
| 2014/0030505 A1* | 1/2014 | Yokogi | C08G 64/305 428/220 |

FOREIGN PATENT DOCUMENTS

| | | | | |
|---|---|---|---|---|
| DE | 2 315 344 | | 11/1973 | |
| JP | 5 239334 | | 9/1993 | |
| JP | 11 291237 | | 10/1999 | |
| JP | 2000351114 A | * | 12/2000 | |
| JP | 2001 138321 | | 5/2001 | |
| JP | 2001 240667 | | 9/2001 | |
| JP | 2002 316316 | | 10/2002 | |
| JP | 2003 512944 | | 4/2003 | |
| JP | 2004 137455 | | 5/2004 | |
| JP | 2007-262399 A | | 10/2007 | |
| JP | 2008 201113 | | 9/2008 | |
| JP | 2009 52027 | | 3/2009 | |
| JP | 2010 17948 | | 1/2010 | |
| JP | 2011 183817 | | 9/2011 | |
| JP | 2012214728 A | * | 11/2012 | ........... C08G 64/305 |
| TW | 200726792 A | | 7/2007 | |
| WO | WO 2012/032774 A1 | | 3/2012 | |
| WO | WO-2012133854 A1 | * | 10/2012 | ........... B29C 47/364 |

OTHER PUBLICATIONS

International Search Report dated Feb. 25, 2014 in PCT/JP2013/084562 filed Dec. 25, 2013.

Combined Search Report and Office Action dated Apr. 11, 2017 in Chinese Patent Application No. 201380072148.X (with English translation of Office Action and English translation of categories of cited documents).

Combined Search Report and Office Action dated Apr. 19, 2017 in Taiwanese Patent Application No. 103102166 (with partial English translation of Office Action and English translation of categories of cited documents).

Yuan Huimin, "New technique for production of malt and beer", China Food Industry Association, Fertilization Industry Laboratory in Beijing, 1983.

* cited by examiner

FIG.3

EXTRUSION PELLETIZER FOR POLYCARBONATE RESIN AND METHOD FOR EXTRUSION-PELLETIZING POLYCARBONATE RESIN

CROSS-REFERENCE TO RELATED APPLICATIONS

This application is a National Stage of PCT/JP2013/08456, which was filed on Dec. 25, 2013. This application is based upon and claims the benefit of priority to Japanese Application No. 2013-019945, which was filed on Feb. 4, 2013.

TECHNICAL FIELD

The present invention relates to an extrusion pelletizer for a polycarbonate resin and a method of extrusion-pelletizing a polycarbonate resin.

BACKGROUND ART

Since a product has been increasingly required to be thinned, in application of an optical film for a light-guiding plate, a crystal liquid display and the like for a mobile phone, a tablet PC and the like, optical defects and a poor appearance caused by minute foreign substances that has been conventionally ignored have become an issue.

A lot of techniques using a leaf-disc polymer filter are disclosed as a typical method of removing foreign substances in polycarbonate, an acrylic resin and the like. For instance, a method of manufacturing an acrylic resin has been proposed including filtration and purification of an acrylic resin composition having a melt viscosity of 2500 Pa·sec or less at 260 degrees C. using a leaf-disc filter of a filtration accuracy of 3 to 25 μm (Patent Literature 1).

Moreover, a method of pelletizing a polymer melt of polycarbonate, which is manufactured by ester interchange, through a leaf-disc polymer filter has been known. For instance, a method of preventing generation of gels by increasing a temperature of the leaf-disc polymer filter with inert gas (e.g., nitrogen) has been proposed (Patent Literature 2).

Further, as the method of removing foreign substances in polycarbonate, for instance, a method has been proposed including polymerizing polycarbonate, adding an additive in a melt state of the polymerized polycarbonate, filtrating the obtained mixture with a polymer filter having an absolute filtration rating in a range from 0.5 to 50 μm, and kneading the filtrated mixture (Patent Literature 3).

Moreover, a method of decreasing volatile impurities by melting and deaerating polycarbonate is also known. For instance, one of the proposed methods of decreasing volatile impurities includes: disposing a biaxial extruder, a polymer filter and a vent biaxial extruder in series; passing polycarbonate through the polymer filter; and melting and deaerting the polycarbonate with the vent biaxial extruder (Patent Literature 4).

CITATION LIST

Patent Literature(s)

Patent Literature 1: JP-A-2010-17948
Patent Literature 2: JP-A-2001-240667
Patent Literature 3: JP-A-5-239334
Patent Literature 4: JP-A-2009-52027

SUMMARY OF THE INVENTION

Problem(s) to be Solved by the Invention

Although the method disclosed in Patent Literature 1 is applicable to an acrylic resin having a low melt viscosity, it is difficult to apply this method to a polycarbonate resin having a high melt viscosity since a differential pressure in a polymer filter is adversely increased.

In the method disclosed in Patent Literature 2, on starting manufacture, nitrogen gas in a polymer filter unit is caught to be mixed in a strand, which may cause pelletization failure such as strand breakage.

An object of the method disclosed in Patent Literature 3 is to decrease foreign substance by deactivating a catalyst for polymerization by a melt method. In Patent Literature 3, although it is studied whether the polymer filter is used or not used, a type of the polymer filter unit is not studied. Effects for decreasing foreign substances are not sufficient.

According to the method disclosed in Patent Literature 4, volatile impurities and foreign substance can be reduced. However, a large sized device is necessary and an extrusion process of a melt resin is prolonged to increase a residence time. For this reason, the polycarbonate resin is thermally deteriorated, which may cause failure such as a poor color.

In other words, in the leaf-disc filter, although the filtration rating is high, in order to filtrate a highly viscous material, it is necessary to decrease the melt viscosity by heating the resin and/or to increase a filtration area by introducing large sized equipment. Moreover, when heating the resin and using the large sized equipment, required electricity is increased and a collateral failure in quality such as a burnt resin and gel generation caused by residence occurs. Although the filter can be changed to a filter having a larger sieve opening to decrease flow resistance of the resin, a performance of the filter to remove foreign substances is unfavorably lowered. Thus, in the method of manufacturing a polycarbonate resin having a high melt viscosity, a method of efficiently manufacturing a polycarbonate resin with less foreign substances with a simple structure has not been known.

An object of the invention is to provide an extrusion pelletizer for a polycarbonate resin, the extrusion pelletizer efficiently manufacturing polycarbonate resin pellets with less foreign substances with a simple structure, and a method of extrusion-pelletizing a polycarbonate resin as follows.

Means for Solving the Problem(s)

In order to solve the above problem, the invention provides an extrusion pelletizer for a polycarbonate resin and a method for extrusion-pelletizing a polycarbonate resin.

According to an aspect of the invention, an extrusion pelletizer extrusion pelletizer for a polycarbonate resin includes: an extruder; a cooling unit; and a cutter, the extruder including: a first adapter that is provided at a cylinder top and is capable of controlling a temperature; a polymer filter unit that is connected to the cylinder top through the first adapter and is capable of controlling a temperature; a second adapter that is capable of controlling a temperature; and a die head that is connected to the polymer filter unit through the second adapter, in which the polymer filter unit has a plurality of stick-shaped filter elements therein, a temperature of the second adapter is set to be lower than a temperature of the polymer filter unit, and the cooling unit and the cutter are disposed under an atmosphere in which an air cleanliness defined in accordance with JIS B 9920 is any one of class 1 to class 7.

In the above aspect of the invention, with use of the polymer filter unit provided with a plurality of stick-shaped (e.g., candle-shaped) filter elements, a filtration surface area can be increased more efficiently than that of a conventional filter element. Specifically, a diameter of the leaf-disc filter is about 12 inches at the maximum. Although the filtration area can be enlarged by increasing the number of the leaf disc, a length of a housing unit in this arrangement is increased. Accordingly, an accumulation area of the resin is likely to be formed in the flow of the resin until an end of the housing, which causes gel generation and a burnt resin. In contrast, in the candle-shaped filter, the filtration area can be enlarged by increasing the number of the filter elements and a surface area can be enlarged within a limited volume.

Moreover, since the temperature of the second adapter is set to be lower than the temperature of the polymer filter unit, generation of air bubbles is prevented in the strand extruded from the extruder. Further, in the above aspect of the invention, with the arrangement that the pelletizing process of the polycarbonate resin after passing through the die head is performed in the clean room, foreign substances in the air can be prevented from being mixed in the polycarbonate resin in the pelletizing process.

According to the above aspect of the invention as described above, polycarbonate resin pellets with sufficiently less foreign substances can efficiently be manufactured with a simple structure.

With this arrangement, each of the stick-shaped filter elements preferably has a filtration rating in a range from 5 μm to 50 μm.

When the filtration rating of the filter element falls within the above range, a size of the foreign substance can be sufficiently decreased and a sufficient productivity can be ensured.

With this arrangement, each of the first adapter and the second adapter preferably includes two or more metallic plates.

When each of the adapters is provided with the plurality of metallic plates, a polymer flow path is easily processed in each of the adapters, so that the polymer filter unit in various shapes can be easily attached.

With this arrangement, preferably, each of the stick-shaped filter elements includes: a lateral surface as a filtering area through which a polycarbonate resin is filtrated; a hollow portion through which the polycarbonate resin filtrated by the filtering area flows; and a discharge portion that defines an end of the filter element and through which the polycarbonate resin from the hollow portion is discharged.

With use of the stick-shaped filter elements, a filtration surface area can be increased more efficiently than that of a conventional filter element.

According to another aspect of the invention, a method of extrusion-pelletizing a polycarbonate resin uses the extrusion pelletizer for the polycarbonate resin according to any one of claims 1 to 4.

According to the above aspect of the invention, polycarbonate resin pellets with sufficiently less foreign substances can be efficiently manufactured with a simple structure of the extrusion pelletizer for a polycarbonate resin of the above aspect of the invention.

In the above method, a temperature of the second adapter is preferably set to be lower than a temperature of the polymer filter unit by 10 degrees C. or more.

When the temperature of the second adapter is thus set to be lower than the temperature of the polymer filter unit by 10 degrees C. or more, generation of air bubbles is prevented in the strand extruded from the extruder.

DESCRIPTION OF EMBODIMENT(S)

An extrusion pelletizer for a polycarbonate resin and a method of extrusion-pelletizing a polycarbonate resin according to an exemplary embodiment of the invention will be described with reference to FIG. 1.

Firstly, an arrangement of the extrusion pelletizer for a polycarbonate resin according to the exemplary embodiment will be described.

Exemplary Embodiment

Figure 1:
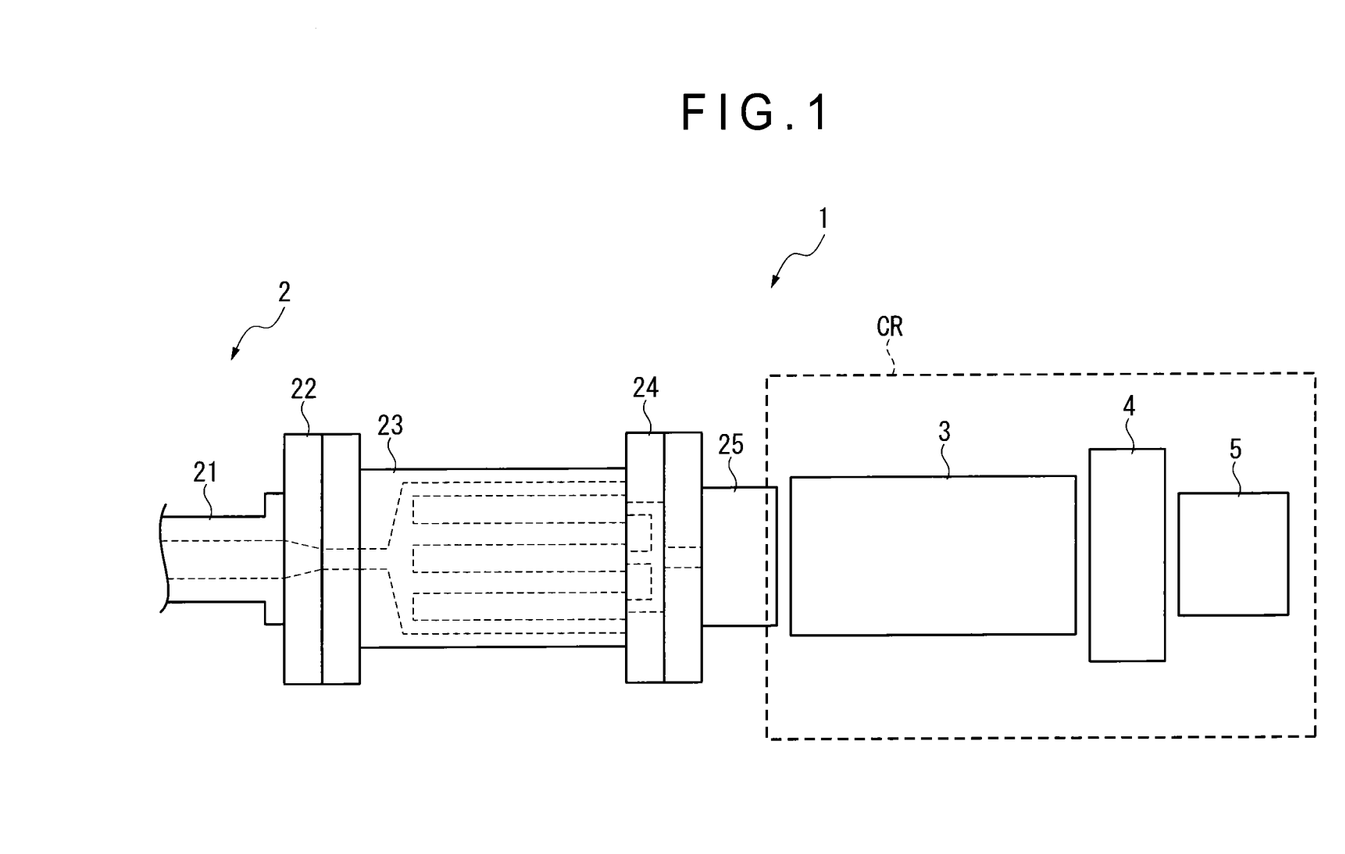
FIG. 1 schematically shows an extrusion pelletizer for a polycarbonate resin according to an exemplary embodiment of the invention.

As shown in FIG. 1, an extrusion pelletizer 1 includes an extruder 2, a cooling unit 3, a cutter 4, and a pellet sorter 5.

The extruder 2 includes: an extruder body (not shown); a cylinder top 21; a first adapter 22 capable of controlling a temperature; a polymer filter unit 23 connected to the cylinder top 21 through the first adapter 22 and capable of controlling a temperature; a second adapter 24 capable of controlling a temperature; and a die head 25 connected to the polymer filter unit 23 through the second adapter 24.

A material for the extruder body, cylinder top 21, first adapter 22, polymer filter unit 23, second adapter 24 and die head 25 is preferably an anticorrosive material such as stainless steel, among which SUS316, SUS316L and the like are specifically used.

As the extruder body, a short-axis extruder, a biaxial extruder and the like are usable. The biaxial extruder is exemplified by extruders having various specifications (e.g., an extruder having two shafts rotatable in the same direction and an extruder having two shafts rotatable in opposite directions), but is not limited thereto.

The first adapter 22 is attached between the cylinder top 21 and the polymer filter unit 23. The first adapter 22 is provided with a plurality of units in order to gradually adjust a shape of a resin outlet of the cylinder top 21 (a circular outlet in a monoaxial extruder, and an eyeglasses-shaped outlet in a biaxial extruder) to a shape of an inlet of the polymer filter unit 23. When the first adapter 22 is provided with the plurality of units, a polymer flow path is easily processed in the first adapter 22, so that the polymer filter unit 23 in various shapes can easily be attached.

The first adapter 22 includes an oil-temperature control circuit, a cartridge heater and the like (not shown). With this arrangement, the first adapter 22 can control a temperature. Moreover, by controlling the temperature of the polymer flowing through the polymer flow path, a viscosity of the polymer can be controlled and a pressure generating in the polymer filter can be controlled.

Figure 2:
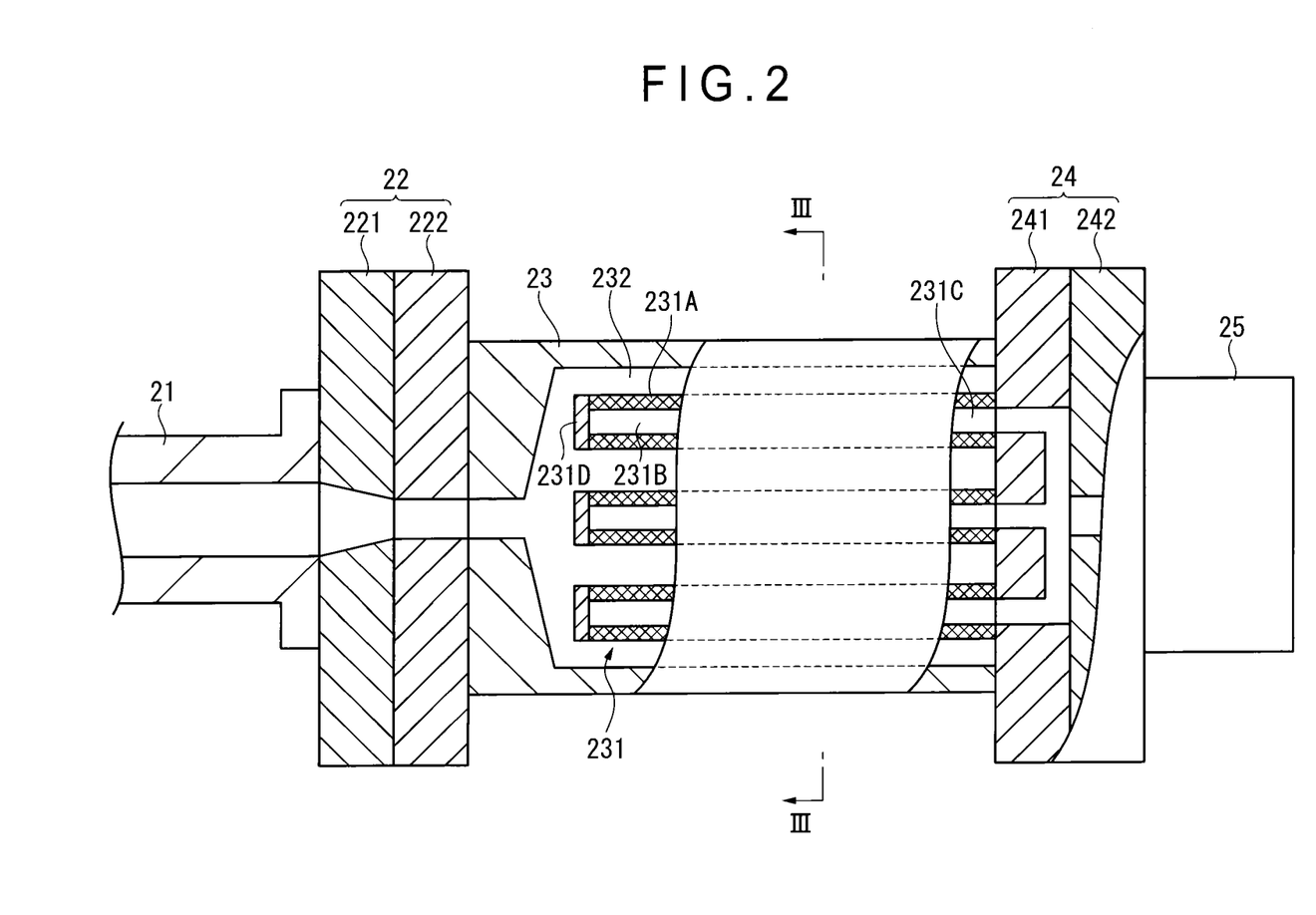
FIG. 2 is a side elevation showing the extruder according to the exemplary embodiment, a part of which is cross-sectionally shown.
Figure 3:
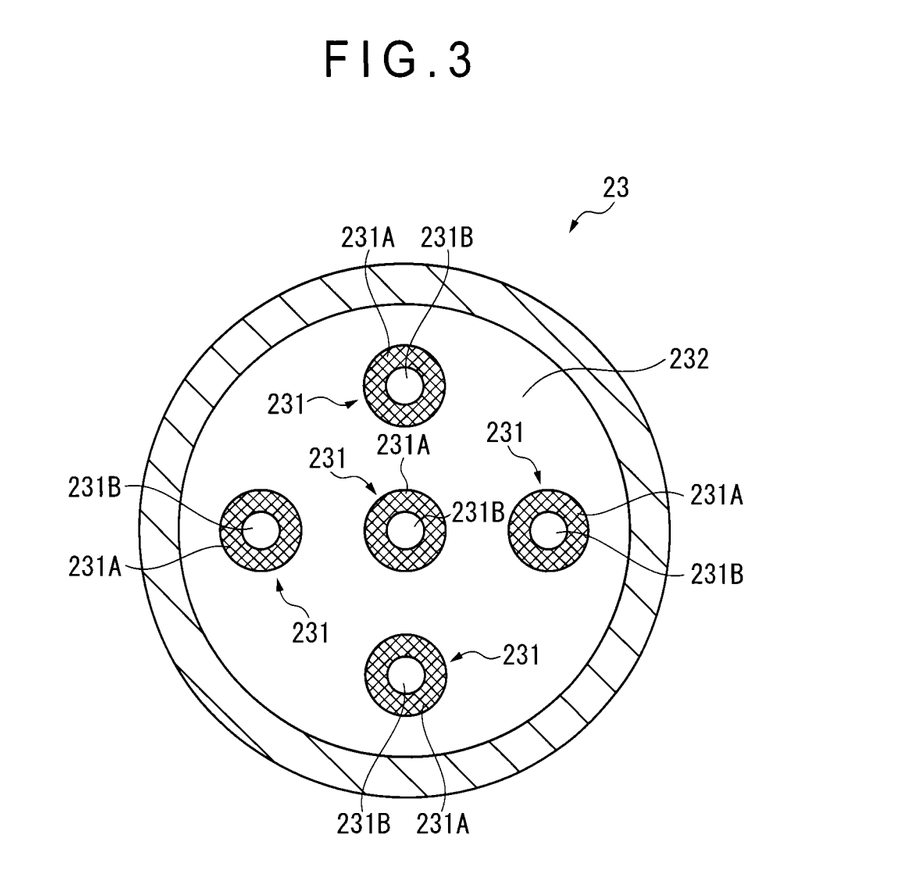
FIG. 3 is a cross section taken along a III-III line in FIG. 2.

The polymer filter unit 23 includes a plurality of stick-shaped filter elements 231 inside the housing 232 as shown in FIGS. 2 and 3. With the plurality of stick-shaped filter elements 231, in the housing 232 of the same volume as that of a typical housing, a filtration area can reach 1.5 times or more as much as that in the typical housing as described below.

Specifically, as a typical polymer filter, a polymer filter in which a plurality of disc filter elements are layered around a center pole has generally been used. In this arrangement, when a highly viscous resin is melt and filtrated, an outlet of the resin is only at the single center pole. Thus, even when a leaf-disc filter element having a high filtration rating (e.g., 10 μm) may be used to increase when a filtration area by increasing the number of the disc, a discharge rate is restricted by an increase in a differential pressure. In contrast, when the plurality of stick-shaped filter elements are used, an area of the outlet of the polymer flowing inside the filter can be increased in addition to the increase in the number of the filter elements. Accordingly, in the housing 232 of the same volume as that of a housing with the leaf-disc filter element, the stick-shaped filter elements can achieve the filtration area of 1.5 times or more as much as the leaf-disc filter element and an increase in the differential pressure can be suppressed.

The polymer filter unit 23 includes an oil-temperature control circuit, a cartridge heater and the like (not shown). With this arrangement, the polymer filter unit 23 can control a temperature.

As shown in FIG. 2, each of the stick-shaped filter elements 231 may include: a filtering area 231A that defines a lateral surface of the filter element 231 and filtrates a polycarbonate resin; a hollow portion 231B through which the polycarbonate resin filtrated by the filtering area 231A flows; a discharge portion 231C that defines an end of the filter element 231 and discharges the polycarbonate resin through the hollow portion 231B; and an end 231D of the filter element 231. Examples of the stick-shaped filter elements 231 are a tubular filter element and a candle-shaped filter element. Among the above, a candle-shaped filter element 231 is suitably used. When a plurality of stick-shaped filter elements (e.g., candle-shaped filter element) are used, an area of the outlet of the polymer flowing inside the filter can be increased in addition to the increase in the number of the filter elements.

As for the candle-shaped filter element 231, a shape of a filter (medium) can be selected from fan-pleated filter, Ultipleat filter and the like and various products are commercially available. The candle-shaped filter element is not particularly limited. An Ultipleat filter element manufactured by Pall Corporation (Japan), which is commercially available, was used in later-described Examples.

A material for the filter element 231 is not particularly limited. In terms of rust resistance, corrosion resistance and strength, stainless steel is preferable, among which SUS304, SUS316L and the like are more preferable and SUS316L is particularly preferable in terms of the corrosion resistance.

The filtration rating of the filter in the filter element 231 is preferably in a range from 5 μm to 50 μm. In consideration of balance of productivity, a size of foreign substances and the like, the filtration rating is more preferably in a range from 10 μm to 30 μm. When a filter having the filtration rating of less than 5 μm is used, a performance of the filter to capture foreign substances in a resin is improved, but the filter tends to be clogged to reduce a continuous duration of use of the filter element and the discharge rate of the resin tends to be decreased due to an increase in a resin pressure at an inlet of the filter to lead to the filter element. On the other hand, when the filtration rating exceeds 50 μm, the increase in the resin pressure is sustained to allow an increase in the discharge rate, but an ability of removing foreign substances tends to be deteriorated.

The second adapter 24 is attached between the polymer filter unit 23 and the die head 25. The second adapter 24 is provided with a plurality of units in order to gradually adjust a shape of a resin outlet of the polymer filter unit 23 to a shape of an inlet of the die head 25. When the second adapter 24 is provided with the plurality of units, a polymer flow path is easily processed in the second adapter 24.

The second adapter 24 includes an oil-temperature control circuit, a cartridge heater and the like (not shown). With this arrangement, the second adapter 24 can control a temperature. A temperature of the second adapter 24 needs to be set to be lower than a temperature of the polymer filter unit 23. When the temperature of the second adapter 24 is set to be equal to or more than the temperature of the polymer filter unit 23, air bubbles are mixed in a strand to hamper manufacturing suitable pellets.

The die head 25 is a portion from which a melt resin after passing through the polymer filter unit 23 and the like is extruded. A shape of a resin outlet of the die head 25 is typically circular and defines a cross section of the strand.

The cooling unit 3 is a unit for cooling and solidifying the melt resin extruded from the die head 25 while delivering the melt resin to the cutter 4. Specifically, a strand bath is preferable in use. Various types of the strand bath are usable. For instance, the strand bath may be configured to cool the strand by (i) constantly supplying and circulating water, specifically, circulating a predetermined volume of water or hot water in a strand bath; (ii) using filtrate water or pure water as the water to be used in the above process (i), the pure water having an electric conductivity controlled to be equal to or less than a predetermined value; and (iii) delivering the strand by a belt conveyor made of a stainless steel wire, disposing spray nozzles at a predetermined interval, and spraying water over the strand by the spray nozzles. In order to prevent foreign substances from being mixed in the strand, for instance, a lid may be provided on a top of the strand bath as a structural countermeasure.

The cutter 4 is a unit for cutting the strand cooled by the cooling unit 3 to provide pellets. A known pelletizer is suitably usable as the cutter 4.

The cooling unit 3 and the cutter 4 need to be disposed under the atmosphere in which the air cleanliness defined in accordance with JIS B 9920 is any one of class 1 to class 7. In order to provide this arrangement, the cooling unit 3 and the cutter 4 only need to be disposed, for instance, in a clean room CR in which the air cleanliness satisfies the above conditions, as shown in FIG. 1. When the cooling unit 3 and the cutter 4 are disposed in such conditions, foreign substances (e.g., dust and dirt) can be prevented from being mixed in the strand and the pellets from the outside.

The pellet sorter 5 is a unit for sorting the pellets obtained by cutting the strand by the cutter 4. As shown in FIG. 1, the pellet sorter 5 is preferably disposed with the cooling unit 3 and the cutter 4 in the clean room CR in which the air cleanliness satisfies the above conditions.

Next, a method of extrusion-pelletizing a polycarbonate resin will be described.

Firstly, the polymer in a melt state is extruded from the cylinder top 21 of the extruder 2 to pass through the first adapter 22 and be flowed into the housing 232 of the polymer filter unit 23. At this time, by controlling the temperature of each of the first adapter 22 and the polymer filter unit 23 with the oil-temperature control circuit (not shown) and the like, the temperature of the polymer flowing through the polymer flow path can be controlled. Here, the temperature of the polymer is preferably controlled at 290 degrees C. or less.

The polymer after flowing in the housing 232 of the polymer filter unit 23 is filtrated with the filtering area 231A of each of the stick-shaped filter elements 231. The filtrated polymer flows through the hollow portion 231B of each of the stick-shaped filter elements 231 to be discharged from the discharge portion 231C to the second adapter 24. At this time, the temperature of the second adapter 24 needs to be lower than the temperature of the polymer filter unit 23. In terms of prevention of air bubbles in the strand, the temperature of the second adapter 24 is lower than the temperature of the polymer filter unit 23 preferably by 10 degrees C. or more, more preferably by 20 degrees C. or more, particularly preferably by 30 degrees C. or more.

The polymer discharged to the second adapter 24 is extruded from the die head 25 through the second adapter 24. The melt resin extruded from the die head 25 is cooled and solidified by the cooling unit 3 to become a strand while being delivered by the cooling unit 3 to the cutter 4. The strand is cut by the cutter 4 to become pellets. The pellets are sorted by the pellet sorter 5 to provide final products. Here, since the cooling unit 3, the cutter 4 and the pellet sorter 5 are disposed in the clean room CR in which the air cleanliness satisfies the above-described conditions, foreign substances (e.g., dust and dirt) can be prevented from being mixed in the strand and the pellets from the outside.

Next, polycarbonate used in the exemplary embodiment will be described.

The polycarbonate used in the exemplary embodiment may be a pure polycarbonate resin or may be a polycarbonate resin composition. A manufacturing method of the polycarbonate is not specified to an interface method, a melt method and the like. However, since a reaction temperature can be set low when manufacturing polycarbonate by the interface method, a high quality resin with less gel generation and foreign substances can be manufactured. Accordingly, the manufacturing method of the polycarbonate resin is preferably the interface method.

An additive such as an antioxidant, a mold releasing agent and an ultraviolet absorbent can be added to the polycarbonate resin composition. The polycarbonate resin composition may contain an acrylic resin, silicone oil, flame retardant and the like.

The polycarbonate resin used in the exemplary embodiment may be an aromatic polycarbonate resin or an aliphatic polycarbonate resin. However, due to superior impact resistance and heat resistance, the aromatic polycarbonate resin is preferably used.

As the aromatic polycarbonate resin, an aromatic polycarbonate resin manufactured by reacting dihydric phenol with a carbonate precursor is typically usable. The aromatic polycarbonate resin can be a main component of the resin composition since the aromatic polycarbonate resin is superior to other thermoplastic resins in terms of the heat resistance, flame retardant properties and impact resistance.

Example of dihydric phenol include: 4,4'-dihydroxydiphenyl; bis(4-hydroxyphenyl)alkane such as 1,1-bis(4-hydroxyphenyl)methane, 1,1-bis(4-hydroxyphenyl)ethane, and 2,2-bis(4-hydroxyphenyl)propane[bisphenol A]; bis(4-hydroxyphenyl)cycloalkane; bis(4-hydroxyphenyl)oxide; bis(4-hydroxyphenyl)sulfide; bis(4-hydroxyphenyl)sulfone; bis(4-hydroxyphenyl)sulfoxide; and bis(4-hydroxyphenyl) ketone. Among the above, bisphenol A is preferable. The dihydric phenol may be a homopolymer provided by one of the above examples of the dihydric phenol or may be a copolymer provided by two or more of the above examples of the dihydric phenol. Further, the polycarbonate resin used in the exemplary embodiment may be a thermoplastic random branched polycarbonate resin obtained by using a polyfunctional aromatic compound together with the dihydric phenol.

Examples of the carbonate precursor include carbonyl halide, haloformate, and carbonate ester, specific examples of which are phosgene, dihaloformate of dihydric phenol, diphenyl carbonate, dimethyl carbonate, and diethyl carbonate.

In the manufacture of the aromatic polycarbonate resin in the exemplary embodiment, a terminal terminator is usable as needed. As the terminal terminator, a known terminal terminator in the manufacture of the aromatic polycarbonate resin is used. Examples of specific compounds as the terminal terminator include phenol, p-cresol, p-tert-butylphenol, p-tert-octylphenol, p-cumylphenol, p-nonylphenol, and p-tert-amylphenol. One of the above monohydric phenol may be used alone and two or more thereof may be used in combination.

The aromatic polycarbonate resin used in the exemplary embodiment may have a branched structure. It is only necessary to use a branching agent in order to introduce the branched structure. Examples of the branching agent are 1,1,1-tris(4-hydroxyphenyl)ethane; α,α',α"-tris(4-hydroxyphenyl)-1,3,5-triisopropylbenzene; 1-[α-methyl-α-(4'-hydroxyphenyl)ethyl]-4-[α',α',-bis(4"-hydroxyphenyl)ethyl] benzene; and compounds having three or more functional groups such as phloroglucin, trimellitic acid, and isatin bis(o-cresol).

Moreover, as the aromatic polycarbonate resin, a homo-aromatic polycarbonate resin is singularly usable. However, in order to increase fluidity without decreasing a viscosity average molecular weight of the resin composition, a mixture of the homo-aromatic polycarbonate resin and a polycarbonate copolymer having repeating units represented by formulae (a-1) and (a-2) below is also usable.

Formula 1

In the formula (a-1), $R^{13}$ and $R^{14}$ each independently represent an alkyl group having 1 to 6 carbon atoms. X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO2-, —O—, or —CO—. a and b each independently represent an integer from 0 to 4.

In the formula (a-2), $R^{15}$ and $R^{16}$ each independently represent an alkyl group having 1 to 3 carbon atoms. Y represents a linear or branched alkylene group having 2 to 15 carbon atoms. c and d each independently represent an integer from 0 to 4. n represents an integer from 2 to 200.

The polycarbonate copolymer can be manufactured by a conventional manufacturing method that is called an interface polymerization method. Specifically, the polycarbonate copolymer can be manufactured by reacting the carbonate precursor such as dihydric phenol, phenol-modified diol and phosgene. More specifically, for instance, in an inactive solvent such as dichloromethane, a catalyst and the branching agent is further added as needed to react with the carbonate precursor such as dihydric phenol, phenol-modified diol and phosgene in the presence of a known molecular weight modifier.

Moreover, the aromatic polycarbonate resin may be an aromatic polycarbonate-polyorganosiloxane copolymer, or may contain the aromatic polycarbonate-polyorganosiloxane copolymer. In this case, the flame retardant properties and the impact resistance at low temperatures can be improved. The polyorganosiloxane forming the copolymer is preferably polydimethylsiloxane in terms of the flame retardant properties.

The polycarbonate used in the exemplary embodiment can be appropriately added with various additives such as an antioxidant, mold releasing agent, ultraviolet adsorbent, lubricant, light stabilizer, plasticizer, bulking agent, antistatic agent, surfactant, flow improver, waxes, filler, coloring agent, surface smoothing agent, light diffusing agent and flame retardant; and an auxiliary agent.

Examples of the antioxidant includes an arylphosphine antioxidant, phosphite antioxidant, phosphate antioxidant, and hindered phenolic antioxidant. The antioxidant can be added at an amount from 0.01 parts by mass to 0.5 parts by mass relative to 100 parts by mass of the polycarbonate resin.

The phenolic antioxidant is not particularly limited, but the hindered phenolic antioxidant is suitably used. Representative examples of the hindered phenolic antioxidant include octadecyl-3-(3,5-di-tert-butyl-4-hydroxyphenyl)propionate, triethyleneglycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythrithyltetrakis[3-(3,5-di-tert-butyl-4-hydroxyphenyl)propionate], N,N'-hexamethylene bis[(3,5-di-tert-butyl-4-hydroxy)-hydrocinnamamide], 2,2-thio-diethylene bis[3-(3,5-di-tert-butyl-4-hydroxyphenyl)propionate], 2,4-bis(n-octylthio)-6-(4-hydroxy-3,5-di-tert-butylanilino)-1,3,5-triazine, 1,3,5-trimethyl-2,4,6-tris(3,5-di-tert-butyl-4-hydroxybenzyl)benzene, tris-(3,5-di-tert-butyl-4-hydroxybenzyl)-isocyanurate, and bis(3,5-di-tert-butyl-4-hydroxybenzyl ethyl phosphonate)calcium.

The phosphorous antioxidant is not particularly limited. Representative examples of the phosphorous antioxidant include; in addition to tris(nonylphenyl)phosphite and 2-ethylhexyl diphenylphosphite; trialkyl phosphite such as trimethylphosphite, triethylphosphite, tributylphosphite, trioctylphosphite, trinonylphosphite, tridecylphosphite, trioctadecylphosphite, distearyl pentaerithrityl diphosphite, tris(2-chloroethyl)phosphite, tris(2,3-dichloropropyl)phosphite; tricycloalkyl phosphite such as tricyclohexyl phosphite; triaryl phosphite such as triphenyl phosphite, tricresyl phosphite, tris(ethylphenyl)phosphite, tris(butylphenyl)phosphite, tris(hydroxyphenyl)phosphite, and tris(2,4-di-tert-butylphenyl)phosphite; trialkyl phosphate such as trimethylphosphate, triethylphosphate, tributylphosphate, trioctylphosphate, tridecylphosphate, trioctadecylphosphate, distearyl pentaerithrityl diphosphate, tris(2-chloroethyl) phosphate, and tris(2,3-dichloropropyl)phosphate; tricycloalkyl phosphate such as tricyclohexy-1-phosphate; and triaryl phosphate such as triphenylphosphate, tricresyl phosphate, tris(nonylphenyl)phosphate, and 2-ethylphenyl diphenyl phosphate. Among the above, triaryl phosphite and triaryl phosphate are suitably used.

The mold releasing agent can be used for improving mold releasing performance from the die in injection molding. As the mold releasing agent, an ester of an aliphatic carboxylic acid (starting material), which is typically purified from vegetable fat and oil, animal fat and oil and the like, with aliphatic alcohol or polyhydric alcohol, and an ester of the aliphatic carboxylic acid with glyceride or the like are used. Since the mold releasing agent is produced from natural substances or the material obtained by purifying the fat and oil, some of the mold releasing agent contain a minute amount of metallic impurities in the additives. Accordingly, a mold releasing agent purified by a metal adsorbent (e.g., hydrotalcite) in order to remove the metallic component in the minute amount may be used. The mold releasing agent can be added at an amount from 0.1 parts by mass to 0.5 parts by mass relative to 100 parts by mass of the polycarbonate resin.

As the ultraviolet absorbent, a benzotriazole compound-based ultraviolet absorbent, a benzotriazine compound-based ultraviolet absorbent, a benzoxazine compound-based ultraviolet absorbent, a 2-cyanoacrylic acid compound-based ultraviolet absorbent, and a benzophenone compound-based ultraviolet absorbent may be added. Among the above, the benzotriazole ultraviolet absorbent is generally used. Examples of the benzotriazole ultraviolet absorbent include 2-(5-methyl-2-hydroxyphenyl)benzotriazole, 2-(2-hydroxy-4-octyloxyphenyl)benzotriazole, 2-[2-hydroxy-3,5-bis(α,α'dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, 2-[2-hydroxy-3-('3,4,5,6-tetra-hydrophthalimide methyl)-5-methylphenyl]benzotriazole, 2,2'-methylenebis[4-(1,1,3,3-tetramethylbutyl)-6-(2H-benzotriazole-2-yl)phenol], a condensate of methyl-3-[3-t-butyl-5-(2H-benzotriazol-2-yl)-4-hydroxyphenyl]propionate with polyethylene glycol (molecular weight: about 300). Among the above, particularly, 2-[2-hydroxy-3,5-bis(α,α-dimethylbenzyl)phenyl]-2H-benzotriazole, 2-(2'-hydroxy-5'-t-octylphenyl)benzotriazole, or 2,2'-methylenebis[4-(1,1,3,3-tetramethylbutyl)-6-(2H-benzotriazol-2-yl)phenol]] is preferably used. One of the above ultraviolet absorbents may be used alone or two or more thereof may be used in combination. The ultraviolet absorbent can be added at an amount from 0.1 parts by mass to 0.5 parts by mass, more preferably from 0.2 parts by mass to 0.4 parts by mass relative to 100 parts by mass of the polycarbonate resin.

According to the above exemplary embodiment, the following advantages can be obtained.
(1) With use of the polymer filter unit 23 provided with the plurality of stick-shaped filter elements 231, a filtration surface area can be increased more efficiently than that of a conventional filter element.
(2) Since the temperature of the second adapter 24 is set to be lower than the temperature of the polymer filter unit 23, generation of air bubbles is prevented in the strand extruded from the extruder 2.
(3) With the arrangement that the pelletizing process of the polycarbonate resin after passing through the die head 25 is performed in the clean room CR, foreign substances in the air can be prevented from being mixed in the polycarbonate resin in the pelletizing process.

(4) Since the filtration rating of each of the stick-shaped filter elements 231 ranges from 5 μm to 50 μm, a size of the foreign substance can be sufficiently reduced and a sufficient productivity can be ensured.

(5) Since each of the first adapter 22 and the second adapter 24 is formed of two or more metallic plates, the polymer flow path is easily processed in the first adapter 22 and the second adapter 24.

Modification of Embodiment(s)

It should be understood that the scope of the invention is not limited to the above-described exemplary embodiment(s) but includes modifications and improvements as long as the modifications and improvements are compatible with the invention.

For instance, though each of the first adapter 22 and the second adapter 24 is formed of two or more metallic plates in the exemplary embodiment, such an arrangement is not a requisite but the first adapter 22 and the second adapter 24 may be formed of three or more metallic plates.

The number of the filter element 231 is five in the exemplary embodiment, but is not limited thereto. The number of the filter element 231 can appropriately be set depending on the size of the housing 232.

EXAMPLE(S)

The invention will be described in detail below with reference to Examples and Comparatives. However, the invention is by no means limited to the contents of Examples and the like. Materials used in Examples and Comparatives are shown below.

Polycarbonate resin A: bisphenol A polycarbonate resin, viscosity number of 40.0, viscosity average molecular weight of 15000, "FN1500" manufactured by Idemitsu Kosan Co., Ltd.

Polycarbonate resin B: bisphenol A polycarbonate resin, viscosity number of 48.8, viscosity average molecular weight of 19000, "FN1900" manufactured by Idemitsu Kosan Co., Ltd.

Polycarbonate resin C: bisphenol A polycarbonate resin, viscosity number of 55.8, viscosity average molecular weight of 22000, "FN2200" manufactured by Idemitsu Kosan Co., Ltd.

Polycarbonate resin D: bisphenol A polycarbonate resin, viscosity number of 33.2, viscosity average molecular weight of 11500, "FN1300" manufactured by Idemitsu Kosan Co., Ltd.

Polycarbonate resin E: polycarbonate copolymer obtained in the following Preparation Example 1, viscosity number 36.9, viscosity average molecular weight 13000

Antioxidant: phosphorous antioxidant, tris(2,4-di-t-butyl-phenyl)phosphite, "IRGAFOS 168" manufactured by Chiba Specialty Chemicals Inc.

Mold releasing agent A: mixture of pentaerythritol stearic acid full ester and pentaerythritol palmitic acid full ester, "Rikester EW-440A" manufactured by Riken Vitamin Co., Ltd.

Mold releasing agent B: stearic acid monoglyceride, "Rikemal S-100A" manufactured by Riken Vitamin Co., Ltd.

Preparation Example 1

A polycarbonate copolymer (PC copolymer) having a repeating unit represented by a formula (I) below and a repeating unit represented by a formula (II) below (a content of the repeating unit represented by the formula (II) being 4 mass %) was prepared as follows.

Formula 2

In the above formulae, $R^1$ and $R^2$ each independently represent an alkyl group having 1 to 6 carbon atoms. X represents a propylene group. $R^3$ and $R^4$ each independently represent an alkyl group having 1 to 3 carbon atoms. Y represents a butylene group. a to d each are 0 and n is an integer from 0 to 200.

Synthesis of Polytetramethyleneglycol-bis(4-hydroxybenzoate)

Under nitrogen atomsphere, 100 parts by mass of polytetramethyleneglycol (PTMG, Mn (number average molecular weight)=1000) and 33.4 parts by mass of methyl p-hydroxybenzoate were heated at 220 degrees C. in the presence of 0.05 parts by mass of dibutyltin oxide to distill methanol. A pressure in a reaction system was reduced to distill excessive methyl p-hydroxybenzoate. 5.0 parts by mass of the reaction product was dissolved in 30 parts by volume of methylene chloride. To the methylene chloride solution, 10 parts by volume of 8 mass % sodium hydrogen carbonate aqueous solution was added. After vigorously mixing the obtained solution for 20 minutes, a methylene-chloride phase was collected by centrifugation. The methylene-chloride phase was concentrated under the reduced pressure to obtain polytetramethyleneglycol-bis(4-hydroxybenzoate) that is phenol-modified diol.

Preparation of PC Copolymer (1) Synthesis Process of PC Oligomer

To a sodium hydroxide aqueous solution having 5.6 mass % concentration, 2000 mass ppm of sodium dithionite was added relative to bisphenol A (BPA) to be dissolved later. BPA was dissolved in the obtained solution so that a BPA concentration became 13.5 mass %, thereby preparing a sodium hydroxide aqueous solution of BPA. In a pipe reactor having a 6-mm inner diameter and a 30-m pipe length, the sodium hydroxide aqueous solution of BPA and methylene chloride were continuously flowed at respective flow rates of 40 L/hr and 15 L/hr while phosgene was continuously flowed at a flow rate of 4.0 kg/hr. The pipe reactor had a jacket, into which cooling water was flowed to keep a temperature of a reaction liquid at 40 degrees C. or less.

The reaction liquid fed from the pipe reactor was continuously introduced to a reactor provided with a baffle and a retreat impeller and having a 40 L inner volume. To the reactor, the sodium hydroxide aqueous solution of BPA at the flow rate of 2.8 L/hr, 25 mass % sodium hydroxide aqueous solution at the flow rate of 0.07 L/hr, water at the flow rate of 17 L/hr, 1 mass % triethylamine solution at the flow rate of 0.64 L/hr were supplied and a reaction was performed at 29 degrees C. to 32 degrees C. The reaction liquid was continuously taken out of the tank reactor and left still to separate and remove an aqueous phase, so that the methylene chloride was collected. In thus obtained polycarbonate oligomer solution, a concentration of the oligomer was 329 g/L and a concentration of a chloroformate group was 0.74 mol/L.

(2) Polymerization of PC Copolymer

The PC oligomer obtained in the above process at the flow rate of 20 L/hr, methylene chloride at the flow rate of 12 L/hr, 40 mass % methylene chloride solution of polytetramethyleneglycol-bis(4-hydroxybenzoate) at the flow rate of 868 kg/hr, 3 mass % triethylamine aqueous solution at the flow rate of 400 ml/hr, and 6.4 mass % sodium hydroxide aqueous solution at the flow rate of 2.3 kg/hr were supplied to a T.K pipeline homomixer 2SL model (manufactured by PRIMIX Corporation). Preliminary polymerization was performed in 3000 rpm revolution to obtain a preliminary polymerization liquid.

Subsequently, the preliminary polymerization liquid and 20 mass % methylene chloride solution of PTBP (p-tert-butylphenol) were supplied at the flow rate of 960 g/hr and 8.8 mass % aqueous solution obtained by dissolving BPA in 6.4 mass % sodium hydroxide aqueous solution was supplied at the flow rate of 14.1 kg/hr to a T.K pipeline homomixer 2SL model (manufactured by PRIMIX Corporation). The mixture solution was emulsified in 3000 rpm rotation to obtain an emulsified liquid. Subsequently, the emulsified liquid was introduced into a jacketed orifice mixer (second reactor) in which two orifice plates each having three holes of 0.8 mm in diameter were inserted in a pipe of 19.05 mm (¾ inch). The emulsified liquid was further supplied to a jacketed 50-L column stirrer with three paddle impellers (third reactor) to be polymerized. Cooling water at 15 degrees C. was delivered into the jacket to adjust an outlet temperature of the obtained polymerization liquid at 30 degrees C.

To a 50-L dilution tank provided with a stirring paddle blade, the polymerization liquid flowing out of the column reactor and methylene chloride for dilution were continuously supplied at 11 L/hr. Subsequently, an emulsion obtained from the dilution tank was introduced to a K. C. C. centrifugal extractor (product name) (manufactured by Kawasaki Heavy Industries, Ltd.: 4 L in inner volume, 430 mm in rotor diameter) and was subjected to centrifugal extraction at 3000 rpm of the number of revolutions to be separated into an aqueous layer and an organic layer.

(3) Alkali Cleaning Process

The organic layer obtained from the centrifugal extractor and 0.03 mol/L sodium hydroxide aqueous solution were supplied at 7.8 L/hr to a T.K pipeline homomixer 2SL model (manufactured by PRIMIX Corporation) and were stirred and mixed at 3000 rpm. A mixture liquid obtained from an outlet of the homomixer was introduced to the centrifugal extractor and was subjected to centrifugal extraction at 3000 rpm of the number of revolutions to be separated into an aqueous layer and an organic layer.

Subsequently, an emulsion obtained from the dilution tank was introduced to a K. C. C. centrifugal extractor (product name) (manufactured by Kawasaki Heavy Industries, Ltd.: 4 L in inner volume, 430 mm in rotor diameter) and was subjected to centrifugal extraction at 3000 rpm of the number of revolutions to be separated into an aqueous layer and an organic layer. The organic layer was supplied to a subsequent acid cleaning process.

(4) Acid Cleaning Process

The organic layer obtained from the centrifugal extractor in the alkali cleaning process and 0.2 mol/L sodium hydroxide aqueous solution were supplied at 7.8 L/hr to a T.K pipeline homomixer 2SL model (manufactured by PRIMIX Corporation) and were stirred and mixed at 3000 rpm. A mixture liquid obtained from the outlet of the homomixer was introduced to a static separation tank to be separated into an aqueous layer and an organic layer. The organic layer was supplied to a subsequent first water cleaning process.

(5) First Water Cleaning Process

The organic layer obtained from the centrifugal extractor and pure water were supplied at 7.8 L/hr to a T.K pipeline homomixer 2SL model (manufactured by PRIMIX Corporation) and were stirred and mixed at 3000 rpm. A mixture liquid obtained from the outlet of the homomixer was introduced to the centrifugal extractor and was subjected to centrifugal extraction at 3000 rpm to be separated into an aqueous layer and an organic layer. The organic layer was supplied to a subsequent second water cleaning process.

(6) Second Water Cleaning Process

The organic layer obtained from the centrifugal extractor and pure water were supplied at 7.8 L/hr to a T.K pipeline homomixer 2SL model (manufactured by PRIMIX Corporation) and were stirred and mixed at 3000 rpm. A mixture liquid obtained from the outlet of the homomixer was introduced to the centrifugal extractor and was subjected to centrifugal extraction at 3000 rpm to be separated into an aqueous layer and an organic layer. A purified polycarbonate methylene chloride solution (the organic layer) was obtained.

(7) Concentration and Dry Process

The purified polycarbonate methylene chloride solution was concentrated and pulverized. The obtained flakes were dried at 105 degrees C. under reduced pressure. Properties of the obtained polycarbonate flakes were as follows. An amount of a residue of polytetramethyleneglycol-bis(4-hydroxybenzoate), which was obtained by NMR, was 4.0 mass %.

A viscosity number measured in accordance with ISO1628-4(1999) was 36.9 (Mv=13000).

Examples 1 to 3 and Comparative 1

A polycarbonate resin composition was kneaded at a discharge rate of 1000 kg/hr using a vent biaxial extruder (L/D=31.5, "TEX65αII" manufactured by Japan Steel Works, Ltd.) and was manufactured into pellets using the extrusion pelletizer 1 shown in FIG. 1. A blend composition of the polycarbonate resin composition and the setting conditions of the extrusion pelletizer 1 are as shown in Table 1. As the candle-shaped filter element, a filter element manufactured by Pall Corporation (Japan) (shape of the filter: Ultipleat) was used. The clean room CR was set so that the air cleanliness therein was at class 7 defined in accordance with JIS B 9920-2002. In Comparative 1, a unit in which the first adapter, the polymer filter unit and the second adapter were integrated was used.

Evaluation of Extrusion Pelletizer and Extrusion-Pelletizing Method

Evaluation of the extrusion pelletizer and the extrusion-pelletizing method was made by the following method in terms of the resin temperature in the extrusion pelletizer, the inlet pressure of the polymer filter and the appearance of the strand, and the viscosity number, viscosity average molecular weight (Mv) of the polycarbonate resin or the polycarbonate resin composition, yellow index (YI) thereof, and foreign substance in the filtered melt polycarbonate resin or polycarbonate resin composition. The obtained results are shown in Table 1.

(vii) Foreign Substance in Filtered Melt 100 g of the collected polycarbonate resin pellets was dissolved in methylene chloride. The obtained solution was subjected to suction filtration with a membrane filter in a bore size of 2.5 μm. Foreign substances collected on the filter were observed with an optical microscope and the number and each size of the foreign substances were recorded.

TABLE 1

| Blend Composition (parts by mass) | | Example 1 | Example 2 | Example 3 | comp. 1 |
|---|---|---|---|---|---|
| | polycarbonate resin A | — | — | — | — |
| | polycarbonate resin B | 100 | 100 | — | — |
| | polycarbonate resin C | — | — | 100 | 100 |
| | antioxidant | 0.02 | 0.02 | 0.02 | 0.02 |
| | mold releasing agent A | 0.3 | 0.3 | 0.3 | 0.3 |
| | mold releasing agent B | — | — | — | — |
| Device Conditions | setting temperature (° C.) of first adaptor | 260 | 260 | 260 | — |
| | setting temperature (° C.) of polymer filter unit | 280 | 280 | 270 | 280 |
| | setting temperature (° C.) of seccond adaptor | 250 | 240 | 250 | — |
| | difference in temperature between adaptors (° C.) | 10 | 20 | 10 | — |
| | resin tempeature (° C.) | 289 | 283 | 289 | 273 |
| | inlet pressure (Mpa) of polymer filter unit | 5.6 | 4.2 | 7.6 | 4.8 |
| | type of filter element | candle | candle | candle | leaf disc |
| | mesh size (μm) of filter element | 10 | 30 | 10 | 90 |
| | setting place of cooling unit and cutter | in clean room | in clean room | in clean room | outside of clean room |
| Evaluation Results | appearance of strand | no air bubble | no air bubble | no air bubble | no air bubble |
| | viscosity average molecular weight amount (Mv) | 18800 | 18900 | 22500 | 22300 |
| | yellow index (YI) | 1.3 | 1.2 | 1.2 | 1.3 |
| | foreign substance in filtered melt (piece/100 g) 10-19 μm | 47 | 96 | 63 | 608 |
| | 20-49 μm | 9 | 32 | 20 | 30 |
| | 50-99 μm | 0 | 1 | 0 | 2 |
| | 100-249 μm | 0 | 0 | 1 | 6 |
| | 250 μm or more | 0 | 0 | 0 | 0 |

(i) Resin Temperature in Extrusion Pelletizer

Thermocouple was set at the downstream of the second adapter, by which the resin temperature was measured.

(ii) Inlet Pressure of Polymer Filter Unit

A pressure sensor was set at the upstream of the second adapter, by which the resin pressure at the inlet was measured.

(iii) Appearance Check of Strand

At the start of the extruder, the discharge rate was at 200 kg/hr. The discharge rate was gradually increased and reached a predetermined discharge rate of 1000 kg/hr after 20 minutes. After 10 minutes since the discharge rate was fixed at 000 kg/hr (after 30 minutes since the extruder was driven), presence or absence of air bubbles in the strand was visually checked. Mixing of the air bubbles can be determined by whitening of the strand.

(iv) Viscosity

A viscosity number of the polycarbonate resin was measured in accordance with ISO1628-4 (1999).

(v) Viscosity Average Molecular Weight (Mv)

As for the collected polycarbonate resin pellets, a limiting viscosity [η] of a methylene chloride solution at 20 degrees C. was measured using an Ubbelohde viscometer. The viscosity average molecular weight was calculated based on the following formula (Schnell Formula).

$$[\eta]=1.23\times10^{-5}\times Mv^{0.83}$$

(vi) Yellow Index (YI)

From the collected polycarbonate resin pellets, a 2-mm thick sample piece was collected using an injecting molding machine ("EC-40" manufactured by TOSHIBA MACHINE CO., LTD.) in which a cylinder temperature was set at 280 degrees C. The sample piece was measured in accordance with JIS K-7105.

As obvious from the results shown in Table 1, when the extrusion pelletizer of the invention was used (in Examples 1 to 3), it was observed that polycarbonate resin pellets containing sufficiently less foreign substances can efficiently be manufactured with a simple structure. In contrast, when the extrusion pelletizer (Comparative 1) including a leaf-disc filter element and the cooling unit and the cutter disposed outside of the clean room was used, it was observed that foreign substances in the filtered melt polycarbonate resin was increased.

Example 4 and Comparative 2

Pellets of a polycarbonate resin composition were manufactured in the same manner as in Example 1 except that a blend composition of the polycarbonate resin and the device conditions for the extrusion pelletizer 1 were changed as shown in Table 2.

Evaluation of Extrusion Pelletizer and Extrusion-Pelletizing Method

Evaluation of the extrusion pelletizer and the extrusion-pelletizing method was made by the above method in terms of the resin temperature in the extrusion pelletizer, the inlet pressure of the polymer filter, the appearance of the strand, the viscosity average molecular weight (Mv) of the polycarbonate resin composition, yellow index (YI) thereof and foreign substance in the filtered melt polycarbonate resin composition. The obtained results are shown in Table 2. In Comparative 2, since air bubbles were mixed in the strand to hamper manufacture of suitable pellets, the polycarbonate resin composition was not evaluated.

TABLE 2

|  |  |  | Example 4 | Comp. 2 |
|---|---|---|---|---|
| Blend Composition (parts by mass) | polycarbonate resin A |  | 100 | 100 |
|  | polycarbonate resin B |  | — | — |
|  | polycarbonate resin C |  | — | — |
|  | antioxidant |  | 0.02 | 0.02 |
|  | mold releasing agent A |  | — | — |
|  | mold releasing agent B |  | 0.05 | 0.05 |
| Device Conditions | setting temperature (° C.) of first adaptor |  | 250 | 250 |
|  | setting temperature (° C.) of polymer filter unit |  | 250 | 250 |
|  | setting temperature (° C.) of seccond adaptor |  | 220 | 250 |
|  | difference in temperature between adaptors (° C.) |  | 30 | 0 |
|  | resin tempeature (° C.) |  | 263 | 263 |
|  | inlet pressure (Mpa) of polymer filter unit |  | 3.2 | 1.2 |
|  | type of filter element |  | candle | candle |
|  | mesh size (μm) of filter element |  | 10 | 10 |
|  | setting place of cooling unit and cutter |  | in clean room | in clean room |
| Evaluation Results | appearance of strand |  | no air bubble | air bubbles |
|  | viscosity average molecular weight amount (Mv) |  | 14800 | — |
|  | yellow index (YI) |  | 1.2 | — |
|  | foreign substance in filtered melt (piece/100 g) | 10-19 μm | 166 | — |
|  |  | 20-49 μm | 18 | — |
|  |  | 50-99 μm | 0 | — |
|  |  | 100-249 μm | 0 | — |
|  |  | 250 μm or more | 0 | — |

As obvious from the results shown in Table 2, when the temperature of the second adapter was set at the same temperature as that of the polymer filter unit, it was found that air bubbles were mixed in a strand, so that an appropriate pellet was not manufactured.

Examples 5 to 6

Pellets of a polycarbonate resin composition were manufactured in the same manner as in Example 1 except that a blend composition of the polycarbonate resin and device conditions for the extrusion pelletizer 1 were changed as shown in Table 3.

Evaluation of Extrusion Pelletizer and Extrusion-Pelletizing Method

Evaluation of the extrusion pelletizer and the extrusion-pelletizing method was made by the above method in terms of the resin temperature in the extrusion pelletizer, the inlet pressure of the polymer filter and the appearance of the strand, and the viscosity average molecular weight (Mv) of the polycarbonate resin composition, yellow index (YI) thereof, and foreign substance in the filtered melt polycarbonate resin composition. The obtained results are shown in Table 3.

TABLE 3

|  |  |  | Example 5 | Example 6 |
|---|---|---|---|---|
| Blend Composition (parts by mass) | polycarbonate resin D |  | 70 | 50 |
|  | polycarbonate resin E |  | 30 | 50 |
|  | antioxidant |  | 0.1 | 0.1 |
|  | mold releasing agent A |  | — | 0.2 |
|  | mold releasing agent B |  | — | — |
| Device Conditions | setting temperature (° C.) of first adaptor |  | 220 | 220 |
|  | setting temperature (° C.) of polymer filter unit |  | 240 | 240 |
|  | setting temperature (° C.) of seccond adaptor |  | 200 | 200 |
|  | difference in temperature between adaptors (° C.) |  | 20 | 20 |
|  | resin tempeature (° C.) |  | 245 | 243 |
|  | inlet pressure (Mpa) of polymer filter unit |  | 2.8 | 2.2 |
|  | type of filter element |  | candle | candle |
|  | mesh size (μm) of filter element |  | 10 | 10 |
|  | setting place of cooling unit and cutter |  | in clean room | in clean room |
| Evaluation Results | appearance of strand |  | no air bubble | no air bubble |
|  | viscosity average molecular weight amount (Mv) |  | 11800 | 12100 |
|  | yellow index (YI) |  | 1.4 | 1.4 |
|  | foreign substance in filtered melt (piece/100 g) | 10-19 μm | 91 | 112 |
|  |  | 20-49 μm | 26 | 47 |
|  |  | 50-99 μm | 2 | 0 |
|  |  | 100-249 μm | 0 | 0 |
|  |  | 250 μm or more | 0 | 0 |

As obvious from the results shown in Table 3, also when the PC copolymer capable of achieving a low viscosity was used (in Examples 5 and 6), it was observed that polycarbonate resin pellets containing sufficiently less foreign substances can efficiently be manufactured with a simple structure in the same manner as in the above Examples.

The invention claimed is:

1. A method of extrusion-pelletizing a polycarbonate resin, the method comprising extrusion-pelletizing a polycarbonate resin with an extrusion pelletizer comprising:
    an extruder comprising a first adapter that is provided at a cylinder top and is capable of controlling a temperature, a polymer filter unit that is directly connected to the cylinder top through the first adapter and is capable of controlling a temperature, a second adapter that is capable of controlling a temperature, and a die head that is connected to the polymer filter unit through the second adapter;
    a cooling unit; and
    a cutter,
    wherein the extrusion-pelletizing comprises:
    extruding a molten polymer to deliver the molten polymer into the polymer filter unit through the first adapter, while controlling the temperature of the first adapter;
    filtering the molten polymer delivered into the polymer filter unit, to obtain a filtered polymer;
    extruding the filtered polymer from the die head through the second adapter, to obtain an extruded polymer;
    cooling the extruded polymer to form a strand; and
    cutting the strand with the cutter to pelletize the strand, wherein:
    the polymer filter unit comprises a plurality of stick-shaped filter elements each having a filtration rating of from 5 μm and 50 μm;
    the stick-shaped filter elements each comprise:
    a lateral surface as a filtering area through which the polycarbonate resin is filtered,
    a hollow portion through which the polycarbonate resin filtered by the filtering area flows, and
    a discharge portion defining an end of the filter element and through which the polycarbonate resin from the hollow portion is discharged;
    the cooling unit and the cutter are disposed under an atmosphere in which an air cleanliness defined in accordance with JIS B 9920 is any one of class 1 to class 7; and
    the controlling of the temperature of the second adapter includes lowering the temperature of the second adapter such that the temperature of the second adapter is lower than a temperature of the polymer filter unit by 10 degrees C. or more.

2. The method according to claim 1, wherein each of the first adapter and the second adapter comprises two or more metallic plates.

3. The method according to claim 1, wherein the first adapter comprises a plurality of units in order to adjust a shape of a resin outlet in a stepwise manner.

4. The method according to claim 1, wherein the first adapter comprises an oil-temperature control circuit and a cartridge heater.

5. The method according to claim 1, wherein the plurality of stick-shaped filter elements includes a candle-shaped filter.

6. The method according to claim 1, wherein the filtration rating of the stick-shaped filter elements is from 10 μm to 30 μm.

7. The method according to claim 1, wherein the second adapter comprises a plurality of units in order to adjust a shape of a resin outlet in a stepwise manner.

8. The method according to claim 1, wherein the second adapter comprises an oil-temperature control circuit and a cartridge heater.

9. The method according to claim 1, wherein a temperature of the molten polymer delivered into the polymer filter unit is 290 degrees C. or less.

10. The method according to claim 1, wherein the controlling of the temperature of the second adapter includes lowering the temperature of the second adapter such that the temperature of the second adapter is lower than a temperature of the polymer filter unit by 20 degrees C. or more.

11. The method according to claim 1, wherein the extruder is a biaxial extruder.

* * * * *